United States Patent
Amos et al.

(10) Patent No.: US 6,965,605 B1
(45) Date of Patent: Nov. 15, 2005

(54) SPLIT ACCESS POINT

(75) Inventors: James A. Amos, N. Canton, OH (US); Michael E. Lewis, Hartville, OH (US)

(73) Assignee: Cisco Technologies, Inc., San Jose, CA (US)

( * ) Notice: Subject to any disclaimer, the term of this patent is extended or adjusted under 35 U.S.C. 154(b) by 766 days.

(21) Appl. No.: 09/949,697

(22) Filed: Sep. 10, 2001

(51) Int. Cl.[7] .......................... H04L 12/28; H04Q 7/24
(52) U.S. Cl. ...................................... 370/401; 370/338
(58) Field of Search .............................. 370/338, 328, 370/401, 465, 469; 709/225, 232, 238; 455/151.2

(56) References Cited

U.S. PATENT DOCUMENTS

2002/0089994 A1 * 7/2002 Leach et al. ................. 370/412
2002/0159407 A1 * 10/2002 Carrafiello et al. ......... 370/328

* cited by examiner

Primary Examiner—Duc Ho
(74) Attorney, Agent, or Firm—Tucker Ellis & West LLP

(57) ABSTRACT

A split access point is disclosed in which an access point controller is provided for management functions of a plurality of wireless clients on a network and one or more media access controls are provided for moving data packets between the network and the wireless clients. One or more radios are provided for communicating with at least one wireless client. In the present invention, one or more of the access point controller, the media access control(s) and the radio(s) are physically separated so as to provide a split wireless access point.

10 Claims, 2 Drawing Sheets

SPLIT ACCESS POINT

BACKGROUND OF THE INVENTION

The present invention is directed to the field of mobile telecommunications, particularly for providing wireless access to a network. With the advent of mobile telecommunications it is increasingly common in network applications, particularly local area network (LAN) systems, to use a wireless access point (AP) to access the network. This allows LAN users mobile access to the network without requiring hardwired connections, thereby allowing greater convenience and utility with less overhead.

In a common-type wireless LAN, the access point provides a data link connection between the wired LAN and the wireless LAN clients. The AP controls "associations," where an RF link has been established between the access point and the client. The AP controls "authentication." An authentication implies that a client is allowed access to the Network. Also, authentication can mean the exchange of security keys between the AP and the client for encryption and decryption, allowing for a secure data link. The access point also buffers packets for clients that are in power save mode. Access points provide test functions for the client to test the data link and RF link connection to the client. The AP provides roaming between other access points. Thus, as a client moves around in a Basic Service Set (BSS) the client is allowed to change association from one access point to the next while maintaining its link to the network.

The client provides the wireless data link to the access point, representing the network interface for a user. The client presents itself as a local area network interface to the host system. This provides for a transparent RF connection to the wired network. In seeking a network association the client scans the air for access points. When not in use, the client provides power save functions.

In a common previous type system, a wireless AP is configured to include a local processor and a wireless LAN card, for receiving communications from a mobile unit. However, this common configuration, while presenting a unified system, results in limitations in antennae control and cable losses at the operation frequency of the radio, which limits the feasible length of the antenna cable, especially at higher operational frequencies.

SUMMARY OF THE INVENTION

In view of the difficulties and drawbacks associated with previous systems, there is therefore a need for a system that allows a greater antennae control and reduces cable losses.

There is also a need for a system with improved performance at higher operational frequencies.

There is also a need for a system that allows for a centralized high speed processor system. This centralized processor will replace the requirement for distributed processing with a high speed processor at each access point node.

These needs and others are satisfied by the split access point architecture of the present invention in which an access point controller is provided for management functions of a plurality of wireless clients on a network and one or more media access controls are provided for moving data packets between the network and the wireless clients. One or more radios are provided for communicating with at least one wireless client. In the present invention, one or more of the access point controller, the media access control(s) and the radio(s) are physically separated so as to provide a split wireless access point.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

The present invention includes a split access point (AP) that provides packet filtering and buffering for its associated clients, preferably wireless clients on a wireless local area network (WLAN). The present split AP can also manage other system functions such as security and data encryption keys. In the present split AP, the control functions are optionally "low level" or "control/status state." A low level media access control (MAC) can be used to maintain media timing and arbitration to control delay times between the router and the split AP, as required by the IEEE 802.11 standard.

A typical access point includes a central processing unit (CPU), along with memory and a Wired Network Interface, typically Ethernet, though other types of network interfaces are also implemented. A Wired Network Interface includes a Media Access Controller (MAC), a Physical Layer (PHY) that provides for the interface to the LAN cabling, and a System Interface that allows the MAC to have access to the buffers in the AP memory. The physical layer for the wireless adapter is typically represented by the radio and antenna. The individual MAC controllers may have local temporary memory of their own for temporary buffer storage. This is useful when problems arise in delivering data packets, where "packet retries" are required. The WLAN MAC has hardware for frame formatting functions, protocol timing functions. The WLAN MAC also manages all radio functions such as frequency of operation, output power, transmit and receive control, and media access control.

Figure 1:
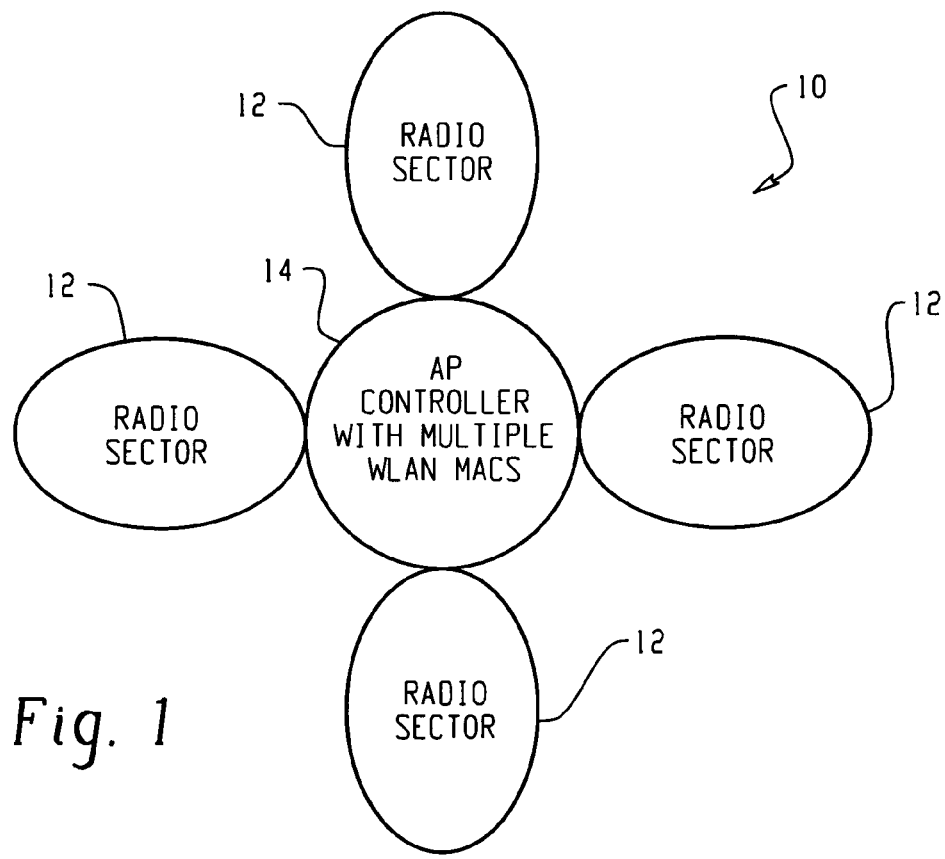
FIGS. 1 and 2 shows a split access point according to a first embodiment of the invention.
Figure 2:
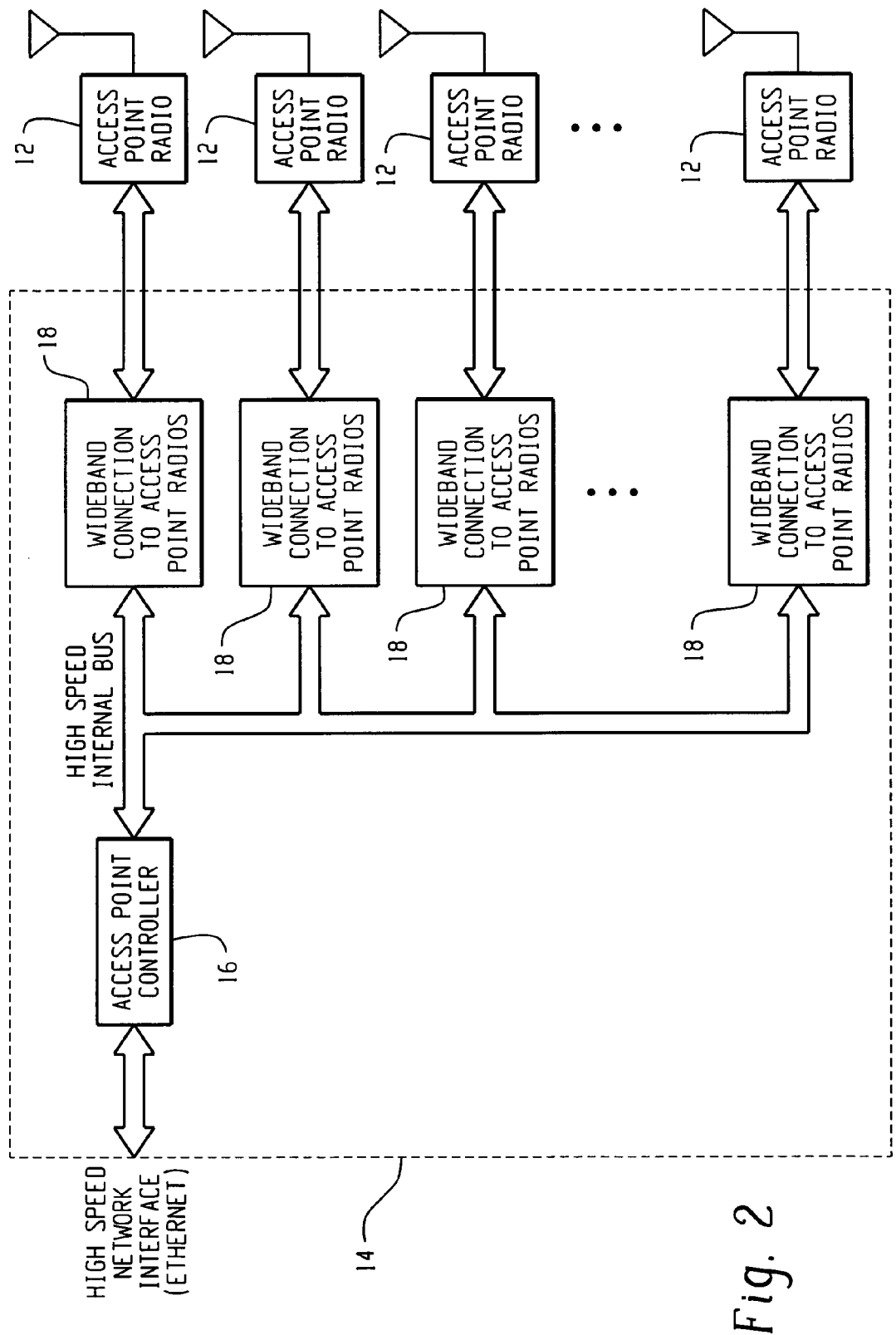

A split access point according to the present invention includes an access point controller for providing the management functions for a plurality of wireless clients on a network. One or more media access controls are included for moving data packets between the network and the wireless clients. The present split AP includes one or more radios for communicating respectively with one or more wireless clients. In the first embodiment shown in FIGS. 1 and 2, the split access point 10 includes one or more radios 12 that are physically isolated from an assembly 14 that includes the AP controller 16 with one or more WLAN MACs 18, where the WLAN MACs 18 are respectively associated with a respective radio 12. In this way, the AP 10 is split at the Wireless LAN MAC to RF control interface. In this embodiment, a plurality of MACs are built into a network switch, and the MACs route the radio data into and out of the respective radio 12 from the network. The plurality of radios 12 preferably use gain antennas, thereby resulting in sectoring of the client space supported by the AP 10. This allows greater sharing of the available client space which increases the actual throughput of the AP 10 to the network by the radios 12, which maximizes the bit rate allowable between the AP wired link to the network. This greatly improves Quality of Service (QoS) for each wireless client as it can alleviate the resources of the wired network shared by all wireless clients. This implementation is useful when the signaling delays between the wireless MAC and RF circuitry are suitably slow enough to allow proper operation of the wireless protocol. Thus at sufficiently high switching times and data rates this implementation will not be realizable.

Alternatively, Note also that the access point controller 16 may reside as part of a network router or switch. This would be just an additional task for these types of network functions sharing the bandwidth of the process of these functions. The data would be directed (routed) to the wireless clients as it does for the other network ports of these boxes. This is accomplished just as if the wireless connection were not there. However, the controller would also have to overlay the additional functions of the access point over this data flow management.

Figure 3:
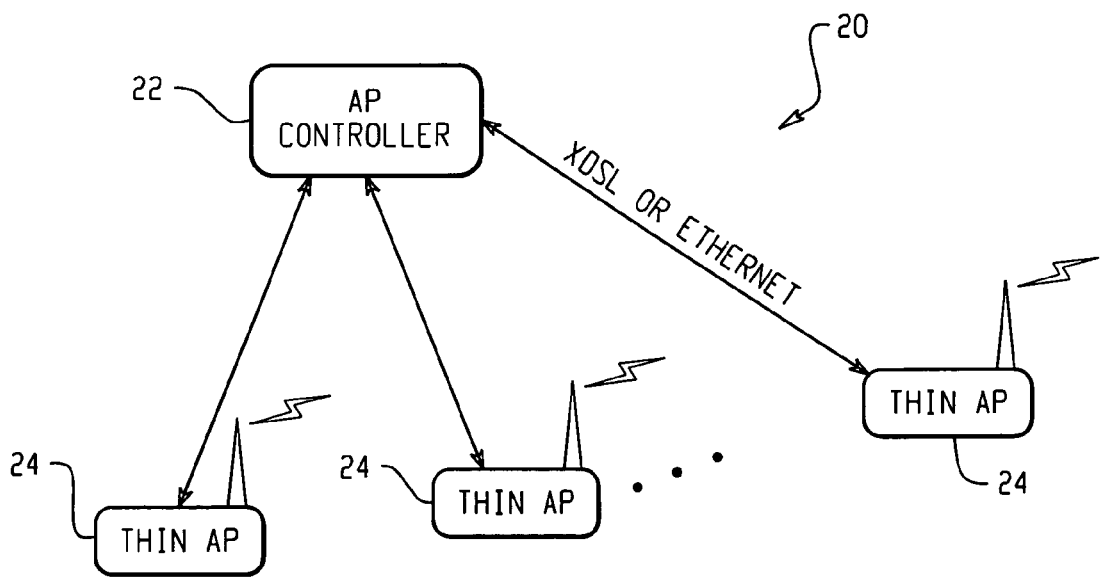
FIG. 3 shows a split access point according to a second embodiment of the invention.

As shown in the alternative embodiment of FIG. 3, the split can be accomplished at the AP controller to WLAN MAC interface. The split access point 20 includes an AP controller 22 that provides a single connection to the wired network. The AP controller 22 is physically isolated from one or more thin APs 24. The thin APs 24 each include a radio and a WLAN MAC, for communicating with wireless clients. The thin AP consists of a WLAN MAC, the RF circuitry, the antenna, and also the high speed interface for communications with the AP Processor. In the preferred embodiment, the thin APs 24 are connected to the AP controller 22 with a high speed connection such as high speed XDSL, Ethernet, Infiniban interfaces, or any other interface that satisfies the minimum bandwidth and latency requirements for an RF data link. This is of course determined by the protocol used for the wireless link and the overall system throughput The present thin AP includes the function of a packet translator for translating packets from the connecting interface protocol to the WLAN protocol. The actual packet management is accomplished by the AP controller 22.

As with the previous embodiment, this embodiment can include directional gain antennas that allow sectoring of the client space. In either embodiment, the respective radios can operate on separate channels to avoid interference. However, a single channel could also be used where the combined system represents the entire access point, and the transmitted signal seen at the protocol level would be the summation of all of the transmitters. All radios would be used for receiving in a diversity fashion, where the receiver with the highest quality signal or a receiver that received the packet error free would be used as the packet or data source. As with the previous embodiment, the multiple radios of the thin APs 24 provide greater network throughput.

With the present invention the centralized AP controller permits a significant amount of management of the RF client space and allows close coordination between the RF client links. With previous Access Point implementations, significant communications between access points are required for coordination of access point functions such as roaming, and load balancing. In present invention these communications can be reduced since additional clients are handled by a given access point processor. In addition, for implementations where a single access point controller is used, these communications is eliminated. Furthermore, additional coordination of channel usage and power levels are more easily realized as the processor has more complete knowledge of the wireless links.

In this way, processing can be done individually for each radio link but from a single central processing node, thus eliminating the expensive and resource-intensive implementation of having a high speed processor systems for each radio link. The present invention allows a single high speed controller for each AP radio. This configuration reduces this count by N-1.

As described hereinabove, the present invention solves many problems associated with previous type methods and systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A split wireless access point comprising:
   an access point controller for providing management functions for a plurality of wireless clients on a network;
   at least one media access control for moving data packets between the network and the wireless clients;
   at least one radio for communicating with at least one wireless client;
   wherein at least one of the access point controller, the media access control and the at least one radio are physically separated so as to provide a split wireless access point;
   wherein at least one media access control and the at least one radio comprise at least one thin access point physically isolated from the access point controller; and
   wherein at least one thin access point is connected to the access point controller with one of a high speed XDSL, Ethernet connection and Infiniban.

2. The split wireless access point of claim 1 wherein the radio is physically isolated from the access point controller and the media access control.

3. The split wireless access point of claim 2 wherein the at least one radio comprises a plurality of radios to achieve sectoring of client space, thereby increasing throughput of access point.

4. The split wireless access point of claim 1 wherein the at least one thin access point comprises a plurality of thin access points connected to the access point controller.

5. The split wireless access point of claim 1 wherein the at least one thin access point comprises a packet translator for translating packets from an interface protocol to a network protocol.

6. A network comprising:
   a network server for providing network functions;
   a network backbone for connecting the server and a plurality of network components;
   at least one split wireless access point comprising:
      an access point controller, connected to the network backbone, for providing management functions for a plurality of wireless clients on the network;
      at least one media access control for moving data packets between the network and the wireless clients;
      at least one radio for communicating with at least one wireless client;

wherein at least one of the access point controller, the media access control and the at least one radio are physically separated so as to provide a split wireless access point;

wherein the at least one media access control and the at lest one radio comprise at least one thin access point physically isolated from the access point controller; and wherein the at least one thin access point is connected to the access point controller with one of a high speed XDSL and Ethernet connection, 7. The network of claim 6 wherein the radio is physically isolated from the access point controller and the media access control.

8. The network of claim 7 wherein the at least one radio comprises a plurality of radios to achieve sectoring of client space, thereby increasing throughput of access point.

9. The network of claim 6 wherein the at least one thin access point comprises a plurality of thin access points connected to the access point controller.

10. The network of claim 6 wherein the at least one thin access point comprises a packet translator for translating packets from an interface protocol to a network protocol.

\* \* \* \* \*